United States Patent
Wang et al.

(10) Patent No.: US 8,194,798 B2
(45) Date of Patent: Jun. 5, 2012

(54) MIMO SYMBOL DECODER AND METHOD FOR DECODING SPATIALLY MULTIPLEXED SYMBOLS USING COMBINED LINEAR EQUALIZATION AND MAXIMUM LIKELIHOOD DECODING

(75) Inventors: Jiacheng Wang, Chaoyang (CN); Hujun Yin, San Jose, CA (US); Yang-Seok Choi, Portland, OR (US); Liang Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 12/346,489

(22) Filed: Dec. 30, 2008

(65) Prior Publication Data
US 2010/0166119 A1    Jul. 1, 2010

(51) Int. Cl.
    *H04L 27/06*    (2006.01)
(52) U.S. Cl. ...................................................... 375/341

(58) Field of Classification Search ................... 375/262, 375/341; 714/794, 795
See application file for complete search history.

(56) References Cited

U.S. PATENT DOCUMENTS

| | | | | |
|---|---|---|---|---|
| 7,711,066 B2 * | 5/2010 | Jiang et al. | | 375/296 |
| 2005/0271166 A1 * | 12/2005 | Love et al. | | 375/341 |

* cited by examiner

*Primary Examiner* — Sam K Ahn
(74) *Attorney, Agent, or Firm* — Schwegman, Lunderg & Woessner, P.A.; Gregory J. Gorrie

(57) ABSTRACT

Embodiments of MIMO symbol decoders and methods for decoding spatially multiplexed symbols using combined linear equalization decoding and maximum likelihood decoding are generally described herein. In some embodiments, one group of symbols (y) received through two or more spatial channels is decoded using a linear equalization decoding technique and another group of symbols is decoded using a maximum likelihood decoding (MLD) technique to generate a soft-bit output. The symbols may be grouped for either linear equalization decoding or MLD based on channel orthogonality or signal-to-interference and noise ratios (SINRs).

20 Claims, 3 Drawing Sheets

MIMO SYMBOL DECODER AND METHOD FOR DECODING SPATIALLY MULTIPLEXED SYMBOLS USING COMBINED LINEAR EQUALIZATION AND MAXIMUM LIKELIHOOD DECODING

TECHNICAL FIELD

Some embodiments pertain to wireless communications. Some embodiments pertain to decoding received signals in multi-antenna systems, such as multiple-input multiple-output (MIMO) systems.

BACKGROUND

Multi-antenna systems, such as multiple-input multiple-output (MIMO) systems, use multiple antennas at both the transmitter and the receiver to communicate parallel streams of data. MIMO systems can achieve significant capacity gain over conventional single antenna systems. MIMO systems conventionally transmit these spatially multiplexed streams on the same frequencies. Orthogonal frequency division multiplexed (OFDM) systems, for example, may use the same set of subcarriers to communicate these parallel streams of data. Because the same frequencies are used, these spatially multiplexed streams need to be separated at the receiver using a decoding process. One issue with the decoding process is the complexity-performance tradeoff. A significant increase in decoding complexity is associated with higher decoding performance levels, especially for higher modulation levels (constellation size) and a greater number of spatial streams.

Thus there are general needs for systems and methods for decoding spatially multiplexed streams with lower complexity that achieve higher decoding performance levels.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
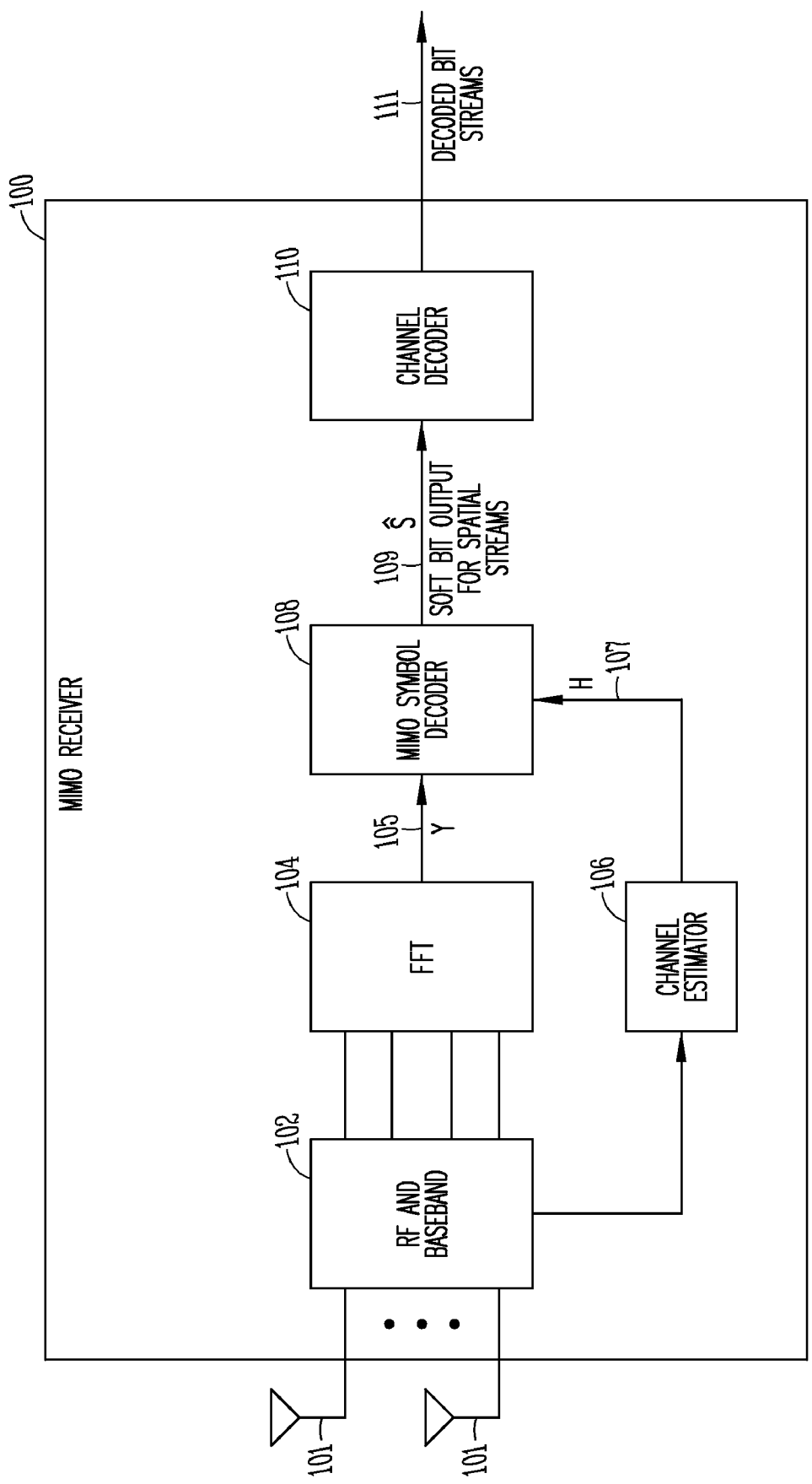
FIG. 1 is a functional block diagram of a MIMO receiver in accordance with some embodiments.

FIG. 1 is a functional block diagram of a MIMO receiver in accordance with some embodiments. MIMO receiver 100 includes two or more antennas 101 to receive radio-frequency (RF) signals, and RF and baseband circuitry 102 to convert the received signals to baseband signals. In MIMO embodiments, antennas 101 may receive two or more spatial streams, which may have been transmitted by a MIMO transmitter with two or more antennas. MIMO receiver 100 may also include channel estimator 106 to generate channel estimate 107 from the received signals. Channel estimate 107 may be in the form of a MIMO channel matrix (H). MIMO receiver 100 may also include MIMO symbol decoder 108 to decode received signals (Y) 105 using channel estimate 107, among other things, and may generate decoded symbols 109 for each of the spatial streams. Received signals (y) 105 may comprise one or more symbols for each of the spatial streams. Decoded symbols 109 may be described as a soft bit output. MIMO receiver 100 may also include channel decoder 110 to perform channel decoding on decoded symbols 109 to generate one or more decoded bit streams 111 for each of the spatial streams that were transmitted. In some embodiments, channel decoder 110 may be any type of encoder that corrects for channel errors, such as a forward error-correcting (FEC) decoder, although the scope of the embodiments is not limited in this respect.

In some multicarrier embodiments, MIMO receiver 100 may receive orthogonal frequency division multiplexed (OFDM) signals through antennas 101. In these embodiments, MIMO receiver 100 may include fast Fourier transform (FFT) circuitry 104 to generate a frequency domain output for each frequency subcarrier of the OFDM signals. In these embodiments, received signals (y) 105 may comprise one or more OFDM symbols for each of the spatial streams.

In accordance with some embodiments, MIMO symbol decoder 108 may use a combination of linear equalization decoding and maximum likelihood decoding (MLD) to achieve improved decoding performance with a lower decoding complexity. These embodiments are described in more detail below.

In a MIMO system, the MIMO transmitter may use $N_{TX}$ transmit antennas to transmit up to $N_{TX}$ parallel streams of data. A MIMO receiver, such as MIMO receiver 100, may have at least $R_{TX}$ receive antennas to receive and decode the spatially multiplexed parallel streams transmitted by the transmitter. MLD provides high decoding performance, however its decoding complexity is on the order of $O(M^{N_{Tx}})$ where M is the constellation size associated with the modulation level, making it impractical for many applications. Linear equalization decoding has a much lower decoding complexity but provides lower decoding performance. Examples of linear equalization decoding techniques include zero-forcing (ZF) and minimum mean square error (MMSE).

In accordance with some embodiments, higher performance MLD and the lower complexity linear equalization decoding are combined to achieve a performance and complexity tradeoff resulting in improved performance with a lower computational cost. In some embodiments, decoding performance similar to that of MLD may be achieved for hard slice detection with complexity similar to that of linear equalization decoding. In some embodiments, one group of symbols 105 (y) received through two or more spatial channels may be decoded by MIMO channel decoder 108 using linear equalization decoding and another group of symbols 105 (y) may be decoded by MIMO channel decoder 108 using MLD to generate soft-bit output 109 for channel decoder 110. In some embodiments, the received symbols may be grouped and selected for either linear equalization decoding or MLD based on channel orthogonality or signal-to-interference and noise ratios (SINRs). These embodiments are described below.

The mathematical model of a MIMO communication system may be represented by the following equation:

$$y = Hs + n \qquad (1)$$

In this equation, y is the received signal from $N_{Rx}$ receive antennas, H is the $N_{Rx} \times N_{Tx}$ MIMO channel matrix, s is the $N_{Tx}$ streams of transmitted data, and n is the uncorrelated Gaussian noise. The MLD solution of (1) may be represented by the following equation:

$$s_{MLD} = \operatorname*{argmin}_{s \in M^{Tx}} \|y - Hs\|^2 \quad (2)$$

Conventional MLD scans for all of $M^{Tx}$ possible transmit signals combination and the complexity is $M^{N_{Tx}}$ for each channel realization decoding.

For linear equalization decoding (e.g., ZF or MMSE), the solution for equation (1) may be represented as:

$$s_{ZF} = \mathrm{slice}[(H^H H)^{-1} H^H y] \quad (3)$$

$$s_{MMSE} = \mathrm{slice}[(H^H H + \sigma^2 I)^{-1} H^H y] \quad (4)$$

where slice is the operation of demodulation, $H^H$ is the conjugate transpose of channel matrix H and $\sigma^2$ is the power ratio of Gaussian noise to signal. The following description uses ZF decoding as an example, however the techniques described herein are equally suitable to MMSE decoding. In some embodiments, MMSE decoding may be used when the signal-to-noise ratio (SNR) is known at receiver 100.

In some embodiments, receiver 100 may be configured to receive OFDM communication signals over a multicarrier communication channel. The OFDM signals may comprise a plurality of orthogonal subcarriers. In some of these multicarrier embodiments, receiver 100 may be part of a wireless local area network (WLAN) communication station such as a wireless access point (AP), base station or a mobile device including a Wireless Fidelity (WiFi) device. In some of the multicarrier embodiments, receiver 100 may be part of a broadband wireless access (BWA) network communication station, such as a Worldwide Interoperability for Microwave Access (WiMax) communication station or a Long-Term-Evolution (LTE) communication station, although the scope of the invention is not limited in this respect as receiver 100 may be part of almost any wireless communication device.

In some embodiments, receiver 100 may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as receiver 100 may also be suitable to transmit and/or receive communications in accordance with other techniques and standards. In some embodiments, receiver 100 may be configured to receive signals in accordance with the IEEE 802.16-2004 and the IEEE 802.16(e) standards for wireless metropolitan area networks (WMANs) including variations and evolutions thereof, although the scope of the invention is not limited in this respect as receiver 100 may also be suitable to transmit and/or receive communications in accordance with other techniques and standards. In some embodiments, receiver 100 may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, receiver 100 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, receiver 100 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 101 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 101 may be effectively separated to take advantage of spatial diversity and the different channel characteristics that may result between each of antennas 101 and the antennas of a transmitting station. In some MIMO embodiments, antennas 101 may be separated by up to $\frac{1}{10}$ of a wavelength or more.

In some embodiments, MIMO symbol decoder 108 may decode parallel symbols 105 of two or more spatial streams $N_{tx}$ received through two or more receive antennas 101. In these embodiments, the number of receive antennas 101 $R_{tx}$ may be greater than or equal to the number of spatial streams $N_{tx}$. The number of spatial streams and the number of receive antennas may be as great as four or more. In some embodiments, the number of spatial streams and the number of receive antennas may as great as ten or more.

In some single code word (SCW) embodiments, a single channel decoder, such as channel decoder 110, may be used to generate a single decoded bit stream from the spatial channels. In some multi-code word (MCW) embodiments, channel decoder 110 may generate a decoded bit stream for each of the spatial channels. In these MCW embodiments, one channel decoder 110 may be used for each spatial channel.

Figure 2:
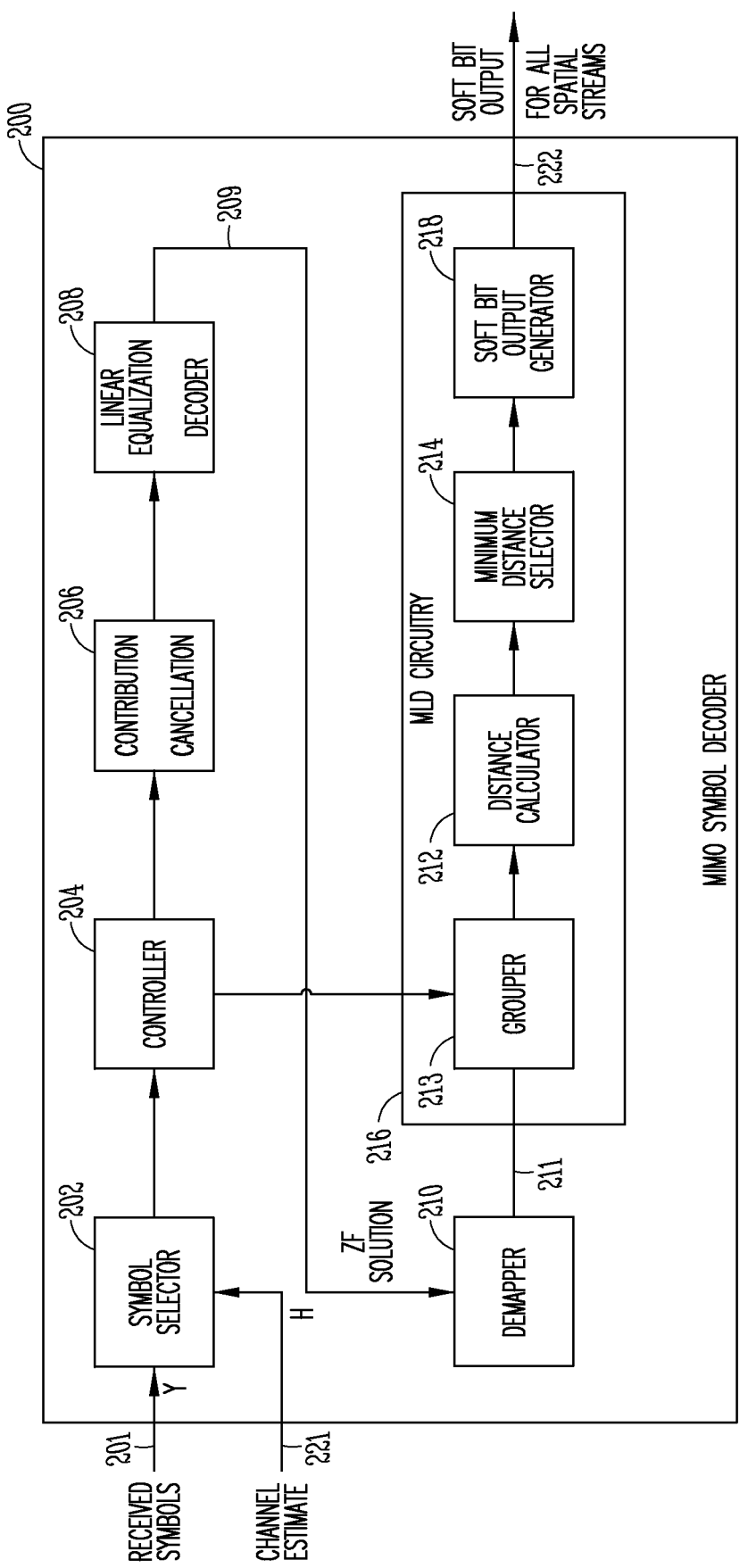
FIG. 2 is a functional block diagram of a MIMO symbol decoder in accordance with some embodiments.

FIG. 2 is a functional block diagram of a MIMO symbol decoder in accordance with some embodiments. MIMO symbol decoder 200 may be suitable for use as MIMO symbol decoder 108 (FIG. 1), although other MIMO symbol decoder configurations may be suitable. In some embodiments, MIMO symbol decoder 200 may include linear equalization decoding circuitry 208 to decode one group of symbols 201 (Y) received through two or more spatial channels using a linear equalization decoding technique and MLD circuitry 216 to decode another group of the symbols 201 (y) using a MLD technique to generate soft-bit output 222 for channel decoder 110 (FIG. 1). Soft-bit output 222 may comprise the soft bits for all the spatial streams.

In some embodiments, MIMO symbol decoder 200 may also include symbol selector 202 to select and group received symbols 201 for either linear equalization decoding or MLD based on channel orthogonality or SINRs. In these embodiments, the first group of symbols may be represented as $s_0 \ldots s_{b-1}$, and the second group of symbols may be represented by $s_b \ldots s_{NTX-1}$, where $N_{TX}$ represents the number of transmitted spatial streams and b is a value selected to be less than or equal to $N_{TX}$.

In some embodiments, MIMO symbol decoder 200 may also include controller 204 and contribution cancellation circuitry 206. Contribution cancellation circuitry 206 and linear equalization decoding circuitry 208 may be configured by controller 204 to perform an iterative interference cancellation process on up to all possible combinations of the symbols of the second group. Linear equalization decoding circuitry 208 may be configured to generate decoded symbol 209 for the first group (e.g., a ZF solution). MIMO symbol decoder 200 may also include demapper 210 to demap the decoded symbols 209 of the first group to generate a set of hard bits 211 for use by MLD circuitry 216. Demapper 210 may convert symbols, such as quadrature-amplitude modulation (QAM) symbols, to bits, although other modulation levels are also suitable. These embodiments of MIMO symbol decoder 200 are described in more detail below, including the operations of MLD circuitry 216.

In some embodiments, according to the complexity and performance requirements, symbol selector 202 may divide the unknown symbols $s_0, \ldots, s_{N_{Tx}-1}$ into two groups: $s_0, \ldots, s_{b-1}$ and $s_b, \ldots, s_{N_{Tx}-1}$. The first group of symbols may be decoded by ZF decoding and the second group of symbols may be decoded by MLD. The decoding complexity may be determined by b. If b is small, most unknown symbols are in the second group and are decoded by MLD with higher complexity. For the special case when b=0, it is equivalent to decoding all symbols by MLD. On the other hand, for larger b (e.g., b<$N_{Tx}$), most unknown symbols are in the first group, which is decoded by ZF decoding with less complexity. When b=$N_{Tx}$-1, it is equivalent to decoding all symbols by ZF decoding. The selection criterion (i.e., which symbol is selected for the first group and which symbol is selected for the second group) is described below.

In some embodiments, symbol selection circuitry 202 may assign each concurrently received symbol 201 to either the first or the second group based on channel orthogonality, and the symbols of the first group may be decoded by the linear equalization decoding technique and symbols of the second group may be decoded by the MLD technique. Symbols (y) 201 may be concurrently received through the spatial channels. In these embodiments, symbol selection circuitry 202 may assign or select 'b' symbols to the first group, and may assign or select $N_{tx}$−b symbols to the second group, where $N_{tx}$ is the number of transmitted streams and b is less than or equal to $N_{tx}$.

In some embodiments, symbol selection circuitry 202 may assign the symbols received through the spatial channels having greater channel orthogonality to the first group, and may assign symbols received through the spatial channels having a lesser channel orthogonality to the second group. Prior to the assignment of the symbols 201 to one of the two groups, the symbol selection circuitry 202 may determine the channel orthogonality for each column of a MIMO channel matrix (H), which may be generated from channel estimate 221. Channel orthogonality may be based on orthogonal property $O(h_i)$ of the MIMO channel matrix (H) for each ($h_i$) column of the MIMO channel matrix (H).

In these embodiments, the orthogonality property of the channel matrix may be represented by the following equation:

$$O(h_i) = \frac{\sum_{j \neq i} |h_j^H h_i|}{h_i^H h_i}, \quad (5)$$

where i=0, ..., $N_{Tx-1}$, and $h_i$ is the i-th column of H.

In some embodiments, $O(h_i)$ may be sorted in decreasing order, and the symbols corresponding to the last b columns $h_i$ with less $O(h_i)$ may be grouped into the first group for ZF decoding and the other symbols may be grouped into the second group for MLD. In this way, symbols that correspond to channel columns that are more orthogonal to each other are more suitable for ZF, since there is less noise enhancement, and better performance may be achieved.

In some alternate embodiments, symbol selection circuitry 202 may assign each concurrently received symbol 201 to either the first or the second group based on a signal-to-interference and noise ratio (SINR) associated with the received symbol. In these embodiments, symbol selection circuitry 202 may assign symbols with a higher SINR to the first group and symbols with a lower SINR to the second group. The symbols assigned to the first group may be decoded by the linear equalization decoding technique and the symbols assigned to the second group may be decoded by the MLD technique. In these alternate embodiments, symbol selection circuitry 202 may similarly assign or select 'b' symbols to the first group and $N_{tx}$−b symbols to the second group. In these embodiments, the SINR may be calculated for each received symbol by symbol selection circuitry 202, and in some embodiments, a post ZF-SINR or a post sum SINR may be used, depending on the interference cancelling capability of MIMO symbol decoder 200.

In these embodiments, prior to the assignment of the symbols 201 to one of the two groups, symbol selection circuitry 202 may sort the symbols based on the post ZF-SINR and assign the symbols to either the first or the second group based on the sorting. In these embodiments, symbols with greater post ZF-SINR may be selected for the first group (e.g., for linear equalization decoding), and symbols with a lesser post ZF-SINR may be selected for the second group (e.g., for MLD decoding). In these embodiments, the post ZF SINR may be calculated based on the following equation:

$$SINR_{Post-ZF}(i) = \frac{SNR}{[(H^H H)^{-1}]} \quad (6)$$

where $SINR_{Post-ZF}(i)$ may be sorted in decreasing order, and the symbols corresponding to the first b columns h, with large $SINR_{Post-ZF}(i)$ may be grouped into the first group for ZF decoding and the other symbols may be grouped into the second group for MLD. For equal power transmission in each $N_{Tx}$ transmit antenna, the post-ZF SINR may be reduced to:

$$SINR_{Post-ZF}(i) = \frac{1.0}{[(H^H H)^{-1}]}. \quad (7)$$

For a MMSE equalizer, post-MMSE SINR may be represented as:

$$SINR_{Post-MMSE}(i) = \frac{1.0}{\left(\left(I + \frac{SNR}{N_{Tx}} H^H H\right)^{-1}\right)_{ii}} - 1.0, \quad (8)$$

where the subscript "ii" denotes the i-th diagonal elements of the matrix.

In some alternate embodiments, symbol combinations with the greatest post ZF-SINR may be selected for the first group (e.g., for linear equalization decoding). In these alternate embodiments, the best b symbols combination out of total $N_{Tx}$ transmitted symbols with maximum total post-ZF SINR may be grouped into the first group for ZF detection, and the other symbols may be grouped into the second group for MLD. In these embodiments, the total symbol combinations may be represented as:

$$\binom{N_{Tx}}{b} = \frac{(N_{Tx})!}{b!(N_{Tx}-b)!} \quad (9)$$

symbol combinations.

Among these symbol combinations, the symbol combination with the largest post-SINR may be selected for ZF. Post-MMSE SINR may follow the same procedure.

In some embodiments, linear equalization decoding circuitry 208 may perform the MMSE decoding when the SNR of received signals is available, and may perform the ZF decoding when the SNR of the received signals is not available. In these embodiments, when the SNR is known or can be determined by the receiver, MMSE decoding may be used, although the scope of the embodiments is not limited in this respect. Reference symbols, transmitted by a transmitting station, may allow the receiver to estimate the noise power and determine the SNR.

In some alternate embodiments, which may be referred to as modified hard slice decoding embodiments, linear equalization decoder 208 may perform the linear equalization decoding technique for all possible combinations of all received symbols. In these embodiments, the linear equalization decoding technique is performed for all possible combinations of b out of the $N_{rx}$ received symbols (symbols of both groups), while the MLD technique is still performed for the symbols of the second group. For example, if $N_{TX}$=4, linear decoding is performed for each possible group of b symbols (b=1, 2, 3, and 4). The MLD technique may be performed for $N_{TX}$-b symbols.

In these modified hard slice decoding embodiments, based on a given selection criterion, the symbols in the two groups may be fixed. The symbols in the first group (e.g., the ZF group) may be changed dynamically (i.e., the size of candidate symbol combinations may be enlarged). The total possible combinations of b symbols out of $N_{Tx}$ may be represented as:

$$\binom{N_{Tx}}{b} = \frac{(N_{Tx})!}{b!(N_{Tx}-b)!}. \quad (10)$$

In this case, all the possible combinations may be considered, although the final complexity may be represented as:

$$\frac{(N_{Tx})!}{b!(N_{Tx}-b)!} M^{N_{Tx}-b}, \quad (11)$$

which is larger than the example described above, but is much smaller than conventional brute-force MLD, especially for large constellation sizes and small $N_{Tx}$ and/or b. For example, if $N_{TX}$=4 and b=3, the complexity for the basic decoding algorithm is M, and for this modified decoding algorithm is 4M. One advantage to these modified hard slice decoding embodiments is that performance is enhanced with a requirement for symbol selection.

In these modified hard slice decoding embodiments, according to the complexity and performance requirement, the number b ($0 \leq b \leq N_{Tx}$) is determined and the decoding complexity is determined by b: high complexity with small b and less complexity with large b. Among the total $N_{Tx}$ transmitted symbols, b symbols for ZF and ($N_{Tx}$-b) symbols for MLD, there are a total of $$\binom{N_{Tx}}{b} = \binom{N_{Tx}}{N_{Tx}-b}$$

combinations.

For each combination of symbols for ZF decoding and MLD, a similar procedure may be followed as described above and the total Euclidean distance $d_{s_b}$ may be calculated.

For all possible b symbols for ZF decoding and ($N_{Tx}$-b) symbols for MLD combinations, total $$\frac{(N_{Tx})!}{b!(N_{Tx}-b)!} M^{N_{Tx}-b}$$

Euclidean distances $d_{s_b}$ are calculated. The symbol $s_b$ may be found, which yields the minimum Euclidean distance, and (ZF(y-$H_b s_b$), $s_b$) may represent the decoded symbol.

In some embodiments, contribution cancellation circuitry 206 may perform an interference cancellation process. In these embodiments, for the second group of symbols (i.e., the group selected for MLD), there may be a total of $M^{N_{Tx}-b}$ candidate combinations. All these possible symbol vectors may be denoted as set $S_b$. For each hypothesis element $s_b \in S_b$, by interference cancellation, the contribution to the received symbols may be subtracted to obtain the remaining signal y-$H_b s_b$, where $H_b$ is the sub-matrix of channel matrix H, whose columns are the columns of H corresponding to the MLD detected symbols $s_b, \ldots, s_{N_{Tx}-1}$.

Linear equalization decoding circuitry 208 may be configured to find the ZF solution of the first group's symbols $s_0, \ldots, s_{b-1}$:

$$\{\hat{s}_0, \ldots, \hat{s}_{b-1}\} = ZF(y - H_b s_b) \quad (12)$$

For each $s_b \in S_b$, calculation of the Euclidean distance may be determined based on:

$$d_{s_b} = \|y - H_b s_b - \overline{H}_b(ZF(y - H_b s_b))\|^2, \quad (13)$$

where $\overline{H}_b$ is the sub-matrix of channel matrix H, whose columns are the columns of H other than columns of $H_b$.

In these embodiments, controller 204 may be configured to cause contribution cancellation circuitry 206 to repeat the interference cancellation operations described above, and to cause the linear equalization decoding circuitry 208 to repeat finding the ZF solution for all elements $s_b \in S_b$, to find the value that yields the minimum Euclidean distance. These solutions may be provided by controller 204 to MLD circuitry 216.

In some embodiments, Euclidian distance calculator 212 may calculate Euclidian distances (d) for the candidate solutions provided by demapper 210 and controller 204, and minimum distance selector circuitry 214 may determine the candidate solutions with the minimum Euclidian distance and provide a decoded bit output.

In some embodiments, MIMO symbol decoder 200 may be configured to generate soft-bit output 222. In these embodiments, MLD circuitry 216 may include solution grouper 213 to group possible solutions provided by demapper 210 and controller 204 into two groups, distance calculator 212, minimum distance selector 214 and soft bit output generator 218. These embodiments are described in more detail below.

In conventional brute-force MLD, log-likelihood ratios (LLRs) for each bit are obtained by taking the difference in distance between the nearest points where the relevant bits are 0 and 1. The LLR for the k-th bit of the i-th transmit antenna is $$LLR_i(k) = \min_{s \in S_{i,k}^+} (d_s^2) - \min_{s \in S_{i,k}^-} (d_s^2) \tag{14}$$

where $S_{i,k}^+$ and $S_{i,k}^-$ are sets of symbol vectors of $N_{Tx}$ constellation points where bit k of the i-th transmit antenna (from the total $N_{Tx} \log_2(M)$ bits) is 1 and 0 respectively. Each set size is $M^{N_{Tx}}/2$ for a total of $M^{N_{Tx}}$.

If noise power is known and equals $\sigma^2$, distance may be determined from the equation $$d_{s,\sigma}^2 = \frac{1}{\sigma^2} \|y - Hs\|^2.$$

In accordance with some embodiments, MLD circuitry 216 may perform a soft decoding process for the basic decoding algorithm. In these embodiments, the set of all $M^{N_{Tx}-b}$ symbol vectors candidate set $Z = \{ZF(y - H_b s_b), s_b\}$ may be divided into two sub-sets, $Z_{i,k}^+$ and $Z_{i,k}^-$, by solution grouper 213, where $Z_{i,k}^+$ are symbol vectors in Z such that the k-th bit of the i-th transmitted symbol is 1, and $Z_{i,k}^-$ are symbol vectors in Z such that the k-th bit of the i-th transmitted symbol is 0. The LLR may be represented as:

$$LLR_i(k) = \min_{s \in Z_{i,k}^+} \{d_s^2\} - \min_{s \in Z_{i,k}^-} \{d_s^2\} \tag{15}$$

In the situation when $Z_{i,k}^+$ is empty such that $Z_{i,k}^- = Z$, the i-th transmit antenna symbol $\hat{s}_i$ may be replaced with M/2 symbols such that the k-th bit is 1 and $\hat{s}_{i,k} = 1$ respectively, and the other $N_{Tx} - 1$ transmit antenna symbols $\hat{s}_0, \ldots, \hat{s}_{i-1}, \hat{s}_{i+1}, \ldots, \hat{s}_{N_{Nx}}$ unchanged, these M/2 consist of another subset $$\tilde{Z}_{i,k}^+ = \{(\hat{s}_0, \ldots, \hat{s}_{i-1}, \{\hat{s}_i | \hat{s}_{i,k} = 1\}, \hat{s}_{i+1}, \ldots, s_{N_{Nx}})\} \tag{16}$$

Thus, the LLR may be represented as:

$$LLR_i(k) = \min_{s \in \tilde{Z}_{i,k}^+} \{d_s^2\} - \min_{s \in Z_{i,k}^-} \{d_s^2\} \tag{17}$$

In the situation in which $Z_{i,k}^-$ is empty such that $Z_{i,k}^+ = Z$, following the same procedure, subset $\tilde{Z}_{i,k}^-$ can be constructed, and the LLR is obtained in a similar manner as in equation (17).

In these embodiments, an algorithm for soft decoding may be performed as follows:

Based on the complexity/performance requirement, determine b ($0 \leq b \leq N_{Tx}$), where b out of $N_{Tx}$ transmit symbols are detected by ZF.

Based on either the SINR or the orthogonal property of the channel matrix, the transmit data streams are decoded by ZF: $s_0, \ldots, s_{b-1}$.

$S_b$ represents the set of all ($N_{Tx} - b$) other possible transmit data streams combinations $S_b = \{(s_b, \ldots, s_{N_{Tx}-1})\}$. In this notation, the sub-script are not necessarily continuous since the some transmit symbols may have been selected for linear equalization decoding. Therefore the size of $S_b$ is $M^{N_{Tx}-b}$.

For each $s_b \in S_b$, find $\hat{s}(s_b) = \{\hat{s}_0, \ldots, \hat{s}_{b-1}\} = ZF(y - H_b s_b)$.

Define Z set of symbol vector for $N_{Tx}$ transmit antennas $Z = \{(ZF(y - H_b s_b), s_b) | s_b \in S_b\}$.

$Z_{i,k}^+$ are the symbol vectors in Z such that the k-th bit of the i-th transmitted symbol is 1, and $Z_{i,k}^-$ are the symbol vectors in Z such that the k-th bit of the i-th transmitted symbol is 0.

LLR for the k-th bit of the i-th transmitted symbol is $$LLR_i(k) = \min_{s \in Z_{i,k}^+} \{d_s^2\} - \min_{s \in Z_{i,k}^-} \{d_d^2\}.$$

If $Z_{i,k}^+$ is empty, then $\tilde{Z}_{i,k}^+$ is constructed as $\tilde{Z}_{i,k}^+ = \{(\hat{s}_0, \ldots, \hat{s}_{i-1}, \{\hat{s}_i | \hat{s}_{i,k} = 1\}, \hat{s}_{i+1}, \ldots, \hat{s}_{N_x})\}$, and replace $Z_{i,k}^+$ by $\tilde{Z}_{i,k}^+$ to calculate the LLR for the k-th bit of i-th transmit symbol. If $Z_{i,k}^-$ is empty, the same procedure is followed to construct $\tilde{Z}_{i,k}^-$.

For the modified hard slicing decoding algorithm discussed above, since for each transmit antenna symbol, it scans all possible M symbols, $Z_{i,k}^+$ and $Z_{i,k}^-$ are always non-empty. The LLR calculation is similar to that of brute-force MLD. Soft decoding for the modified algorithm is as follows:

Based on the complexity/performance requirement, determine b (0 b $N_T$), where b out of $N_{Tx}$ transmit symbols are detected by ZF.

From the total $N_{Tx}$ symbols, b symbols are selected for ZF detection and ($N_{Tx} - b$) symbols for MLD; there are a total of $$\binom{N_{Tx}}{b} = \frac{(N_{Tx})!}{b!(N_{Tx}-b)!}$$

selection combinations. For each combination, there are total $M^{N_{Tx}-b}$ symbol vectors which are the possible candidate solutions according to the corresponding MLD and ZF detection. A total of $$\frac{(N_{Tx})!}{b!(N_{Tx}-b)!} M^{N_{Tx}-b}$$

symbol vector candidates comprise the set Z, i.e., the size of Z is $$\frac{(N_{Tx})!}{b!(N_{Tx}-b)!}M^{N_{Tx}-b}.$$

$Z_{i,k}^+$ are the symbol vectors in Z such that the k-th bit of the i-th transmitted symbol is 1, and $Z_{i,k}^-$ are the symbol vectors in Z such that the k-th bit of the i-th transmitted symbol is 0.

The LLR of the k-th bit of the i-th transmitted symbol is $$LLR_i(k) = \min_{s \in Z_{i,k}^+}\{d_s^2\} - \min_{s \in Z_{i,k}^-}\{d_s^2\}.$$

Although MIMO receiver 100 (FIG. 1) and MIMO symbol decoder 200 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of MIMO receiver 100 (FIG. 1) and MIMO symbol decoder 200 may refer to one or more processes operating on one or more processing elements.

In some embodiments, MIMO symbol decoder 200 may be suitable for use in cancellation of interferences in CDMA systems (i.e., 3G systems).

Figure 3:
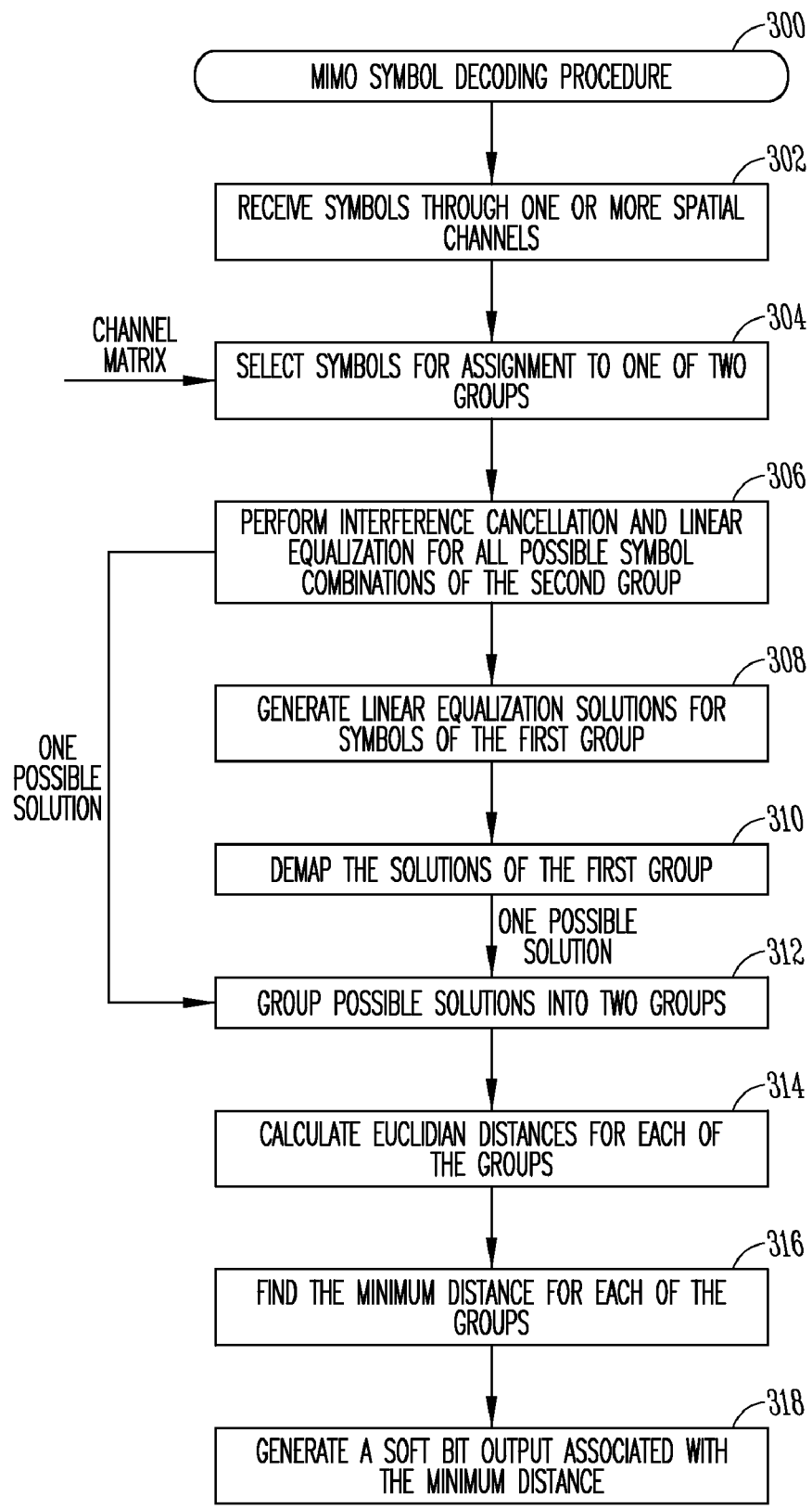
FIG. 3 is a flow chart of a MIMO symbol decoding procedure in accordance with some embodiments.

FIG. 3 is a flow chart of a MIMO symbol decoding procedure in accordance with some embodiments. MIMO symbol decoding procedure 300 may be performed by a MIMO symbol decoder, such as MIMO symbol decoder 200 (FIG. 2), although other decoder configurations may also be used to perform procedure 300.

In operation 302, symbols, such as symbols 201, are received through one or more spatial channels.

In operation 304, the received symbols are selected for assignment into one of two groups. Symbol selector 202 may perform operation 304 and may select one group for linear equalization decoding and another group for MLD. The election may be based on channel orthogonality using the channel matrix or may be based on SINR as discussed above.

In operation 306, interference cancellation and linear equalization may be performed for all possible symbol combinations of the MLD group. Controller 204 may configure contribution cancellation circuitry 206 and linear equalization decoder 208 for these operations as described above.

In operation 308, the linear equalization solutions may be generated for the group selected for linear equalization decoding. Linear equalization decoder 208 may perform operation 308 as described above.

In operation 310, the solutions from operation 308 may be demapped to generate hard bits representing one possible solution. Demapper 210 may perform operation 310 as described above.

In operation 312, the possible solutions from operations 306 and 310 may be grouped into two groups, $Z^+$ and $Z^-$. Grouper 213 may perform operation 312 as described above.

In operation 314, the Euclidian distances may be calculated for both of the groupings from operation 312. Distance calculator 212 may perform operation 314 as described above.

In operation 316, the minimum distance may be determined for each of the groups. Minimum distance selector 214 may perform operation 316 as described above to find minimum distances $d^+$ and $d^-$.

In operation 318, a soft-bit output associated with the minimum distances may be generated. Soft-bit output generator 218 may perform operation 318 to generate soft-bit output 222, which may comprise soft bits for each of the spatial streams that were received.

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any tangible medium for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multiple-input multiple-output (MIMO) symbol decoder comprising:
    symbol selection circuitry to assign symbols received through two or more spatial channels to either a first group or a second group;
    linear equalization decoding circuitry to decode the first group of symbols using a linear equalization decoding technique; and
    maximum likelihood decoding (MLD) circuitry to decode the second group of symbols using a MLD technique to generate a soft-bit output.

2. The MIMO symbol decoder of claim 1
wherein the symbol selection circuitry is configured to either:
assign symbols with a higher signal-to-interference and noise ratio (SINR) to the first group and assign symbols with a lower SINR to the second group, or
assign symbols received through a spatial channel with greater channel orthogonality to the first group and assign symbols received through a spatial channel with a lesser channel orthogonality to the second group.

3. The MIMO symbol decoder of claim 1 wherein the first and second groups of symbols are concurrently received through the spatial channels,
wherein the symbol selection circuitry is configured to assign the symbols received through the spatial channels having greater channel orthogonality to the first group, and to assign symbols received through the spatial channels having a lesser channel orthogonality to the second group.

4. The MIMO symbol decoder of claim 3 wherein prior to the assignment of the symbols to one of the two groups, the symbol selection circuitry is configured to determine channel orthogonality for each column of a MIMO channel matrix, and
wherein the channel orthogonality is based on an orthogonal property of the MIMO channel matrix for each column of the MIMO channel matrix.

5. The MIMO symbol decoder of claim 1 wherein the symbols are concurrently received through the spatial channels, and
wherein the MIMO symbol decoder further comprises symbol selection circuitry to assign each of the concurrently received symbols to either the first or the second group based on a signal-to-interference and noise ratio (SINR) associated with the received symbol.

6. The MIMO symbol decoder of claim 5 wherein the symbol selection circuitry assigns symbols with a higher SINR to the first group and symbols with a lower SINR to the second group, and
wherein the symbols assigned to the first group are decoded by the linear equalization decoding technique and the symbols assigned to the second group are decoded by the MLD technique.

7. The MIMO symbol decoder of claim 6 wherein prior to the assignment of the symbols to one of the two groups, the symbol selection circuitry is configured to sort the symbols based on a post zero-forcing (ZF) SINR and to assign the symbols to either the first or the second group based on the sorting.

8. The MIMO symbol decoder of claim 1 wherein the linear equalization decoding circuitry is configured to perform either Minimum Mean Square Error (MMSE) decoding or zero-forcing (ZF) decoding.

9. The MIMO symbol decoder of claim 8 wherein the linear equalization decoding circuitry is configured to perform the MMSE decoding when a signal-to-noise ratio (SNR) of received signals is available, and
wherein the linear equalization decoding circuitry is configured to perform the ZF decoding when the SNR of the received signals is not available.

10. The MIMO symbol decoder of claim 2 wherein the MIMO symbol decoder is part of a MIMO receiver configured to decode the parallel symbols of two or more spatial streams received through two or more receive antennas, and
wherein the number of receive antennas is greater than or equal to the number of spatial streams.

11. A multiple-input multiple-output (MIMO) symbol decoder comprising:
linear equalization decoding circuitry to decode a first group of symbols received through two or more spatial channels using a linear equalization decoding technique;
maximum likelihood decoding (MLD) circuitry to decode a second group of symbols received through the spatial channels using a MLD technique to generate a soft-bit output;
contribution cancellation circuitry; and
a demapper,
wherein the contribution cancellation circuitry and the linear equalization decoding circuitry are configured by a controller to perform an iterative interference cancellation process on combinations of the symbols of the second group,
wherein the linear equalization decoding circuitry is configured to generate decoded symbols for the first group, and
wherein the demapper is configured to demap the decoded symbols to generate a set of hard bits.

12. A multiple-input multiple-output (MIMO) symbol decoder comprising:
linear equalization decoding circuitry to decode a first group of symbols received through two or more spatial channels using a linear equalization decoding technique; and
maximum likelihood decoding (MLD) circuitry to decode a second group of symbols received through the spatial channels using a MLD technique to generate a soft-bit output,
wherein the MIMO symbol decoder may be configured to generate a soft-bit output, and
wherein the MLD circuitry groups solutions from the linear equalization decoding group and the MLD decoding group into two groups, calculates Euclidian distances for each of the groups and generates the soft-bit output based on minimum Euclidian distances associated with the groups.

13. A method for decoding symbols concurrently received through more than one spatial channel in a multiple-input multiple-output (MIMO) receiver, the method comprising:
assigning symbols received through two or more spatial channels to either a first group or a second group;
decoding the first group of symbols using a linear equalization decoding technique; and
decoding the second group of symbols using a maximum likelihood decoding (MLD) technique to generate a soft-bit output.

14. The method of claim 13 further comprising assigning each of the concurrently received symbols to either the first or the second group based on channel orthogonality, wherein symbols of the first group are decoded by the linear equalization decoding technique and symbols of the second group are decoded by the MLD technique,
wherein symbols received through spatial channels having greater channel orthogonality are assigned to the first group, and symbols received through spatial channels having a lesser channel orthogonality are assigned to the second group.

15. The method of claim 14 further comprising determining the channel orthogonality for each column of a MIMO channel matrix, and
wherein the channel orthogonality is based on an orthogonal property of the MIMO channel matrix for each column of the MIMO channel matrix.

16. The method of claim 13 further comprising assigning each of the concurrently received symbols to either the first or the second group based on a signal-to-interference and noise ratio (SINR) associated with the received symbol,
wherein symbols with a higher SINR are assigned to the first group and symbols with a lower SINR are assigned to the second group.

17. A multiple-input multiple-output (MIMO) receiver comprising:
fast Fourier transform circuitry to generate symbols from orthogonal frequency division multiplexed (OFDM) signals concurrently received through two or more spatial channels; and
a MIMO symbol decoder to assign symbols received through two or more spatial channels to either a first group or a second group, to decode the first group of symbols using a linear equalization decoding technique and to decode the second group of the symbols using a maximum likelihood decoding (MLD) technique to generate a soft-bit output.

18. The MIMO receiver of claim 17 wherein the MIMO symbol decoder comprises:
linear equalization decoding circuitry to decode the first group of symbols using the linear equalization decoding technique;
MLD circuitry to decode the second group of symbols using the MLD technique; and
symbol selection circuitry to assign each of the concurrently received symbols to either the first or the second group based on channel orthogonality,
wherein symbols received through spatial channels having greater channel orthogonality are assigned to the first group and symbols received through spatial channels having a lesser channel orthogonality are assigned to the second group.

19. The MIMO receiver of claim 17 wherein the MIMO symbol decoder comprises:
linear equalization decoding circuitry to decode the first group of symbols using the linear equalization decoding technique;
MLD circuitry to decode the second group of symbols using the MLD technique; and
symbol selection circuitry to assign each of the concurrently received symbols to either the first or the second group based on a signal-to-interference and noise ratio (SINR) associated with the received symbol,
wherein symbols with a higher SINR are assigned to the first group and symbols with a lower SINR are assigned to the second group.

20. The MIMO receiver of claim 17 wherein the MIMO symbol decoder further comprises contribution cancellation circuitry and a demapper,
wherein the contribution cancellation circuitry and the linear equalization decoding circuitry are configured by a controller to perform an iterative interference cancellation process on combinations of the symbols of the second group,
wherein the linear equalization decoding circuitry is configured to generate decoded symbols for the first group, and
wherein the demapper is configured to demap the decoded symbols to generate a set of hard bits.

* * * * *